(12) United States Patent
Sin

(10) Patent No.: US 7,119,703 B2
(45) Date of Patent: Oct. 10, 2006

(54) DIE ANTI-TAMPERING SENSOR

(75) Inventor: Lim Eng Sin, Singapore (SG)

(73) Assignee: FTD Solutions Pte. Ltd., Singapore (SG)

( * ) Notice: Subject to any disclaimer, the term of this patent is extended or adjusted under 35 U.S.C. 154(b) by 233 days.

(21) Appl. No.: 10/926,506

(22) Filed: Aug. 26, 2004

(65) Prior Publication Data

US 2006/0044138 A1    Mar. 2, 2006

(51) Int. Cl.
  *G08B 21/00*    (2006.01)
(52) U.S. Cl. ............... 340/652; 340/657; 340/660; 174/50
(58) Field of Classification Search .......... 340/652, 340/657, 660, 635, 653, 500, 506, 508, 511, 340/568.1; 174/50, 520
  See application file for complete search history.

(56) References Cited

U.S. PATENT DOCUMENTS

| 4,132,987 | A | * | 1/1979 | Devereaux ............... 340/506 |
| 4,357,601 | A | * | 11/1982 | McWilliams ............ 340/506 |
| 5,097,253 | A | * | 3/1992 | Eschbach et al. ....... 340/545.1 |
| 5,533,123 | A | | 7/1996 | Force et al. ............... 380/4 |
| 5,543,782 | A | * | 8/1996 | Rothbaum et al. ...... 340/568.2 |
| 5,561,417 | A | * | 10/1996 | Rothbaum et al. ...... 340/568.2 |
| 5,881,155 | A | | 3/1999 | Rigal ....................... 380/44 |
| 6,245,992 | B1 | | 6/2001 | Hou .......................... 174/50 |
| 2005/0146435 | A1 | * | 7/2005 | Girvin et al. ............ 340/568.2 |
| 2005/0179548 | A1 | * | 8/2005 | Kittel et al. ............. 340/568.2 |

* cited by examiner

*Primary Examiner*—Phung T. Nguyen
(74) *Attorney, Agent, or Firm*—Saile Ackerman LLC; Stephen B. Ackerman

(57) ABSTRACT

This sensor circuit and method for defending against tampering with an integrated circuit die uses metal wire loops to protect the circuitry. In addition, these metal wire loops have several via pairs along its length. One of the vias of the via pair goes to a NAND gate which detects a break in a section of a metal wire loop. A second via of the via pair is used to periodically discharge a metal wire loop to remove residual charge, in preparation for charging the metal wire loop and detecting any uncharged section. A given integrated circuit can have one or more metal wire loops on top of the circuitry to be protected. Each metal wire loop has one or more NAND gates. These outputs of the NAND gates can be fed into OR gates to produce an overall signal which activates an alarm or other security action such as erasure of electrically erasable programmable read only memory (EEPROM).

40 Claims, 3 Drawing Sheets

DIE ANTI-TAMPERING SENSOR

BACKGROUND OF THE INVENTION

1. Field of the Invention

The present invention generally relates to the general field of protecting integrated circuits against unwanted intrusion or tampering. More particularly, this invention relates to a sensor circuit and a method, which uses metal wire loops to protect integrated circuit dies from unwanted tampering.

2. Description of the Prior Art

The circuitry and memory of certain integrated circuits are sensitive and need to be protected from unwanted tampering. Various applications such as automatic teller machines, ATMs, require a high level of protection from external tampering and deciphering of the circuitry and memory. Similarly, pay-per-view television cable boxes require protection against intruders who may attempt to steal cable services by tampering with circuits and memory within the cable boxes. Previous means of protecting circuits include passivation layers covering the sensitive electronic layers. Security boxes also have been used to enclose the sensitive circuitry. Electronic techniques include imbedding security microprocessor macros on the same chip as the circuitry to be protected. These security processor macros have the means of generating random keys and other cryptographic data objects which are used to render the contents of memory such as electrically erasable programmable read only memory (EEPROM) unreadable even if the data is successfully obtained.

- U.S. Pat. No. 5,533,123 (Force et al.) describes a Secured Processing Unit (SPU) chip, a microprocessor designed especially for secure data processing. The system is based on 3 interrelated systems: 1) detectors to alert the SPU of an attack, 2) filters to weigh the severity of the attack, 3) responses or countermeasures to deal with the attacks. The system provides much flexibility via programming the SPU.
- U.S. Pat. No. 5,881,155 (Rigal) describes a security device for preventing access to confidential information stored in a semiconductor chip, or protected chip. The security device comprises a second semiconductor chip, or protective chip, with the two chips facing each other and being coupled to each other by communication terminals. The protective chip can measure resistances through the semiconductor resin and can determine, at least from the measured resistances, an encryption key intended to be communicated to the protect chip to protect the confidential information.
- U.S. Pat. No. 6,245,992 (Hou) describes a an integrated circuit (IC) chip security box which includes a top cover member and a bottom cover member to enclose an IC chip mounted to the circuit board. The cover members are made of conductive material for blocking radio frequency emission from the IC chip. Conductive members are formed on one of the cover members and the circuit board and engage with each other when the security box is mounted to the circuit board thereby forming an electrical loop. Unauthorized opening of the security box breaks the electrical loop thereby causing a signal to the IC chip to initiate a purging process which deletes program codes written in the chip and prevents unauthorized copy of the codes.

However, the various prior art protection schemes mentioned are either very complex or they require a substantial about of power dissipation within the integrated circuit.

SUMMARY OF THE INVENTION

It is therefore an object of the present invention to provide a circuit and a method for protecting against tampering of integrated circuits. It is further an object of this invention to provide a low power, simple circuit implementation.

The objects of this invention are achieved by a metal wire loop located in a metallization layer above the integrated circuits to be protected. There is a semiconductor load device which charges said metal wire loop to a logical '1' level. There is a multiplicity of semiconductor devices which discharge said metal wire loop to a logical '0' level at certain periodic times. In addition, there is a NAND logic gate, with logic inputs, placed among said integrated circuits. There is a multiplicity of vias connecting a multiplicity of points along said metal wire loop down to said inputs of said NAND logic gate within said integrated circuit. Also, a multiplicity of vias connecting a multiplicity of points along said metal wire loop down to said semiconductor devices allow the discharge of said metal wire loop to a logical '0' level at certain periodic times. There is also an output of said NAND logic gate which goes to a logic '1' and activates an alarm and security action whenever any one of said NAND inputs goes to logical '0'. The circuit and method has metal wire loops placed over the circuitry and memory to be protected.

The objects of this invention are further achieved by utilizing multiple NAND gates which are fed by groups of vias from the metal wire loop. The outputs of these NAND gates are sent to the inputs of an OR gate. The output of the OR gate is the collective security alarm signal. This invention is easily implemented in standard device and integrated circuit technology. It is compatible with most circuit functions implemented in semiconductor technology. In addition, the sensor design does not dissipate any static power, and is therefore a very low power solution to the anti-tampering problem.

The objects of this invention are further achieved by placing multiple metal wire loops over different sections of the integrated circuit if the sensitive circuitry needs to be protected in isolated sections. The different metal wire loops feed separate NAND gates which feed separate OR gates to produce separate security alarm signals. These separate security alarm signals can initiate separate security actions for their respective circuits or memory.

The above and other objects, features and advantages of the present invention will be better understood from the following detailed description taken in conjunction with the accompanying drawings.

DESCRIPTION OF THE PREFERRED EMBODIMENT

Figure 1:
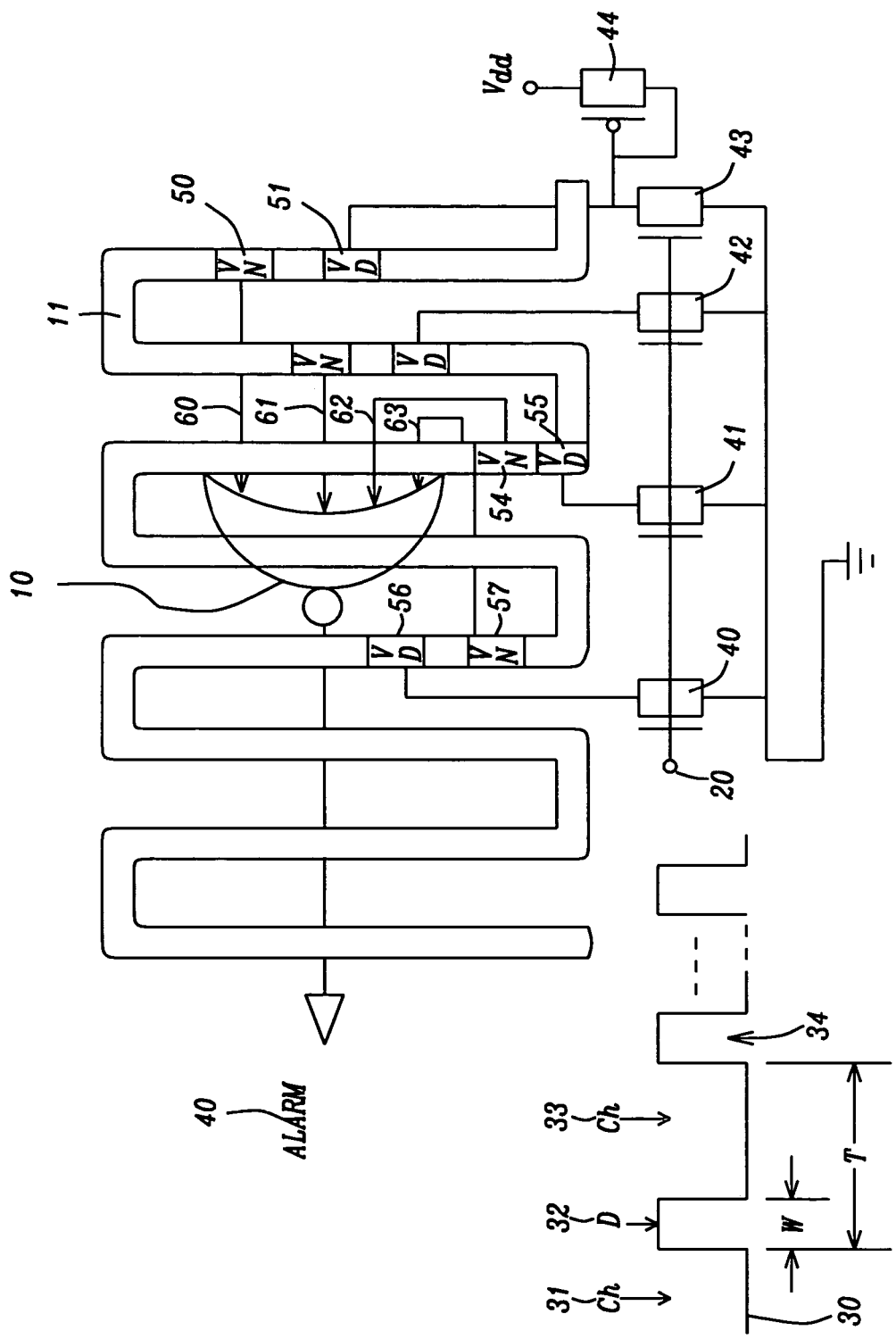
FIG. 1 shows a circuit schematic of the main embodiment of this invention.

FIG. 1 shows the main embodiment of this invention. It shows a metal wire loop 11 on top of circuitry in an integrated circuit die. The wire loop is placed over the circuitry or memory, which is to be secured from intrusion.

The figure also shows a control clock waveform 30, which feeds the gates of devices 40, 41, 42, 43, and 44.

The metal wire loop is made up of a metallization layer within the semiconductor die. The loop could also be implemented with polysilicon or other conductive material. The geometry and spacing of the metal wire loop is dictated by the dimensions of the circuit & memory region and by the line widths and spacings and device dimensions within the circuitry to be protected. The fingers of the metal wire loop must be close enough to each other to prevent an unwanted probing or tampering of the circuitry below the metal wire loop.

FIG. 1 also shows via pairs spaced periodically on the metal wire loop. The figure shows the via pair VD 56 and VN 57. Via VD represents a connection from the metal wire loop 11 down to the drain diffusion of discharge NMOS FET 40. Via VN represents a connection from the metal wire loop 11 down to an input to a logical NAND gate. The via pairs are distributed across the length of the metal wire loop. The vias divide the metal wire loop into smaller metal segments. The multiplicity of VN vias, which go down and feed inputs to the NAND logic gate 10, allows the VN vias to be close to any potential metal wire loop intrusion or line break. Any line break or intrusion along the length of the metal wire loop will cause the metal wire loop segment to discharge from a logical '1' to a logical '0'. This is because the metal wire loop is separated from the PMOS charging 'load' device 44 by the intrusion line break. This '1' to '0' transition is transmitted from the metal wire loop line break down to the NAND gate 10 input 60–63 by way of via, VN.

Via VD, a discharge via are spaced across the length of the metal wire loop to allow the periodic discharge of the metal wire loop node. This periodic charging and discharging of the metal wire loop is implemented to allow tampering to be detected if the tampering is done after powering up the chip.

FIG. 1 shows a control clock 30 attached to the gate line of the discharge devices 40, 41, 42, & 43. This clock waveform defines the control states for the discharge process described in the previous paragraph. When the control clock is at an active 1 level 32, the waveform is labeled 'D' for discharge. This is when the discharge devices 40, 41, 42, and 43 are turned ON allowing the metal wire loop node 11 to discharge to ground through discharge devices 40, 41, 42, & 43. In FIG. 1, when the control clock waveform 30 is low, the metal wire loop node 11 is charged to a '1' level. This occurs since the low levels 31, 33 of the control clock waveform turn off the discharge devices 40, 41, 42, and 43. In addition, the load device 44 is allowed to charge up the metal wire loop node 11. This charge time is denoted by 'ch' in FIG. 1. Also, it is during the charge, 'ch', time of the control clock waveform 30 that the circuit is able to "sense" a break in the metal wire loop by the process explained earlier. To allow a reasonable amount of "sense" time, which is the protection time, the 'D' pulse width 'W' is a small percentage of the period, 'T'.

The NAND gate 10 shown in FIG. 1 detects any '1' to '0' transition on any of its inputs 60, 61, 62, or 63. As mentioned previously, inputs 60, 61, 62, or 63 are tied to the vias VN such as 50, 52, 54, and 56 shown in FIG. 1. These vias, VN are attached to the metal wire loop at various points. The voltage level of one or more of the vias VN, will go low if there is a break in the metal wire loop near the given via, VN. When any one or more of the NAND inputs is pulled low by a break in the metal wire loop, the output 40 of the NAND gate will go high. This high output is used to sound an alarm or to produce other security actions. These security actions could include erasure of memory, programmable read only memories, and changes of secure cryptography keys and signals.

Figure 2:
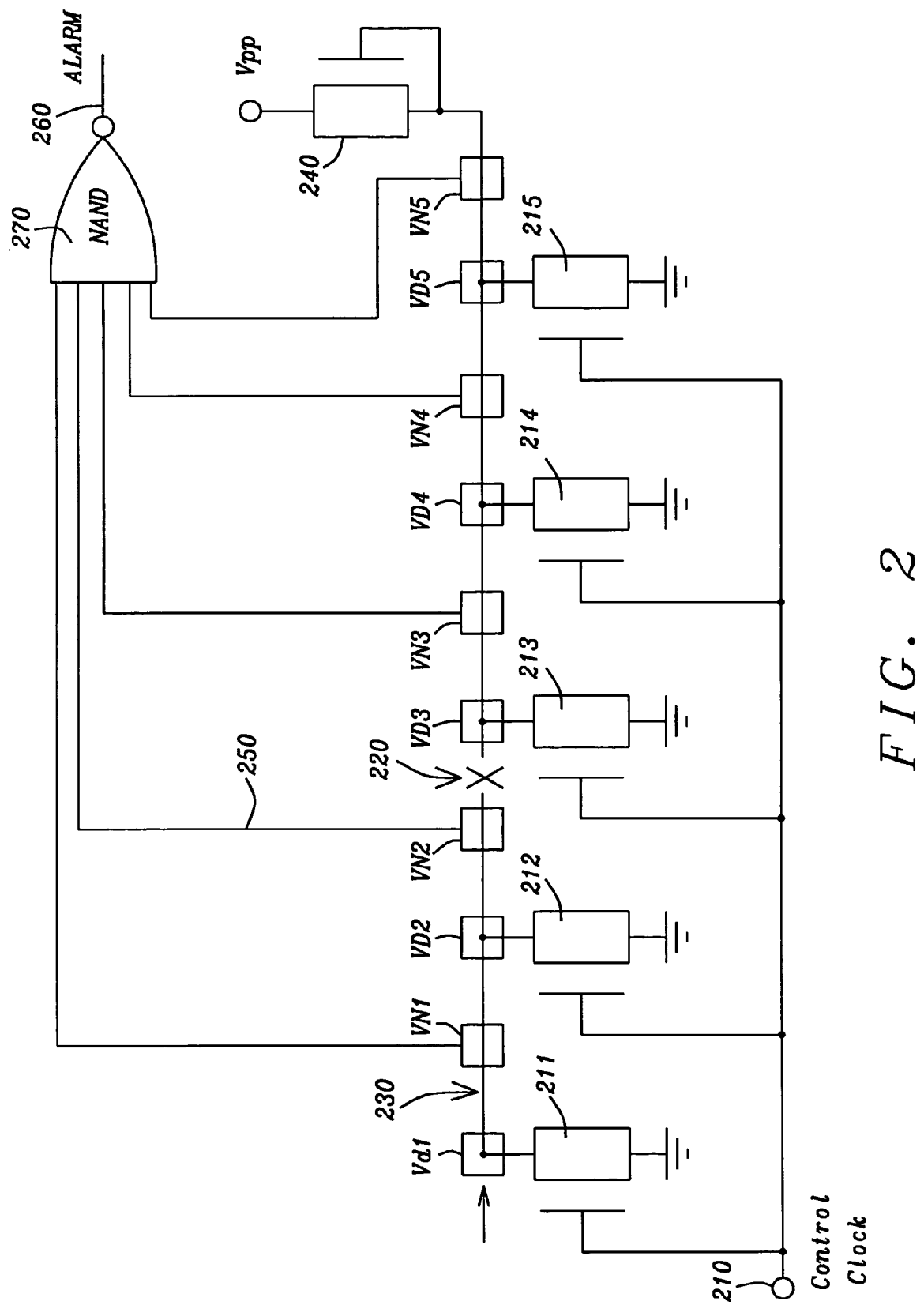
FIG. 2 shows a nodal view of the metal wire loop of the main embodiment of this invention.

FIG. 2 shows the same embodiment as in FIG. 1, but it represents the metal wire loop 230 as a straight-line node. This metal wire loop 230 has five vias pairs shown (VD1, VN1, VD2, VN2, VD3, VN3, VD4, VN4, VD5, and VN5). FIG. 2 illustrates a case where there is an intrusion or break in the metal wire loop node 230 at location 220. This break 220 causes the section of metal wire loop near via VN2 to be disconnected from the PMOS charging load device 240. Recall that the charging PMOS device 240 is no longer attached to the metal wire loop 230 in the vicinity of VN2. The inability to transit from '0' to '1' causes the NAND gate 270 output which is the Alarm 260 to go high.

In addition, FIG. 2 shows the discharge devices 211–215 which are turned ON periodically by the control clock 210. The control clock 210 pulses ON periodically for a short time as mentioned previously to discharge excess charge from the metal wire loop node 230. This periodic discharge allows the detection of a metal wire loop break via the switching current discharge mechanism mentioned above.

FIG. 1 shows the simplicity of the sensor circuit of this invention. It uses simple metal wire loops over circuit devices on lower semiconductor levels. It uses simple NMOS FET transistors as discharge devices, and it uses simple PMOS charging load devices. It uses simple semiconductor NAND and Or logic gates. These simple elements allow this sensor circuit to easily be implemented with most integrated circuits.

Figure 3:
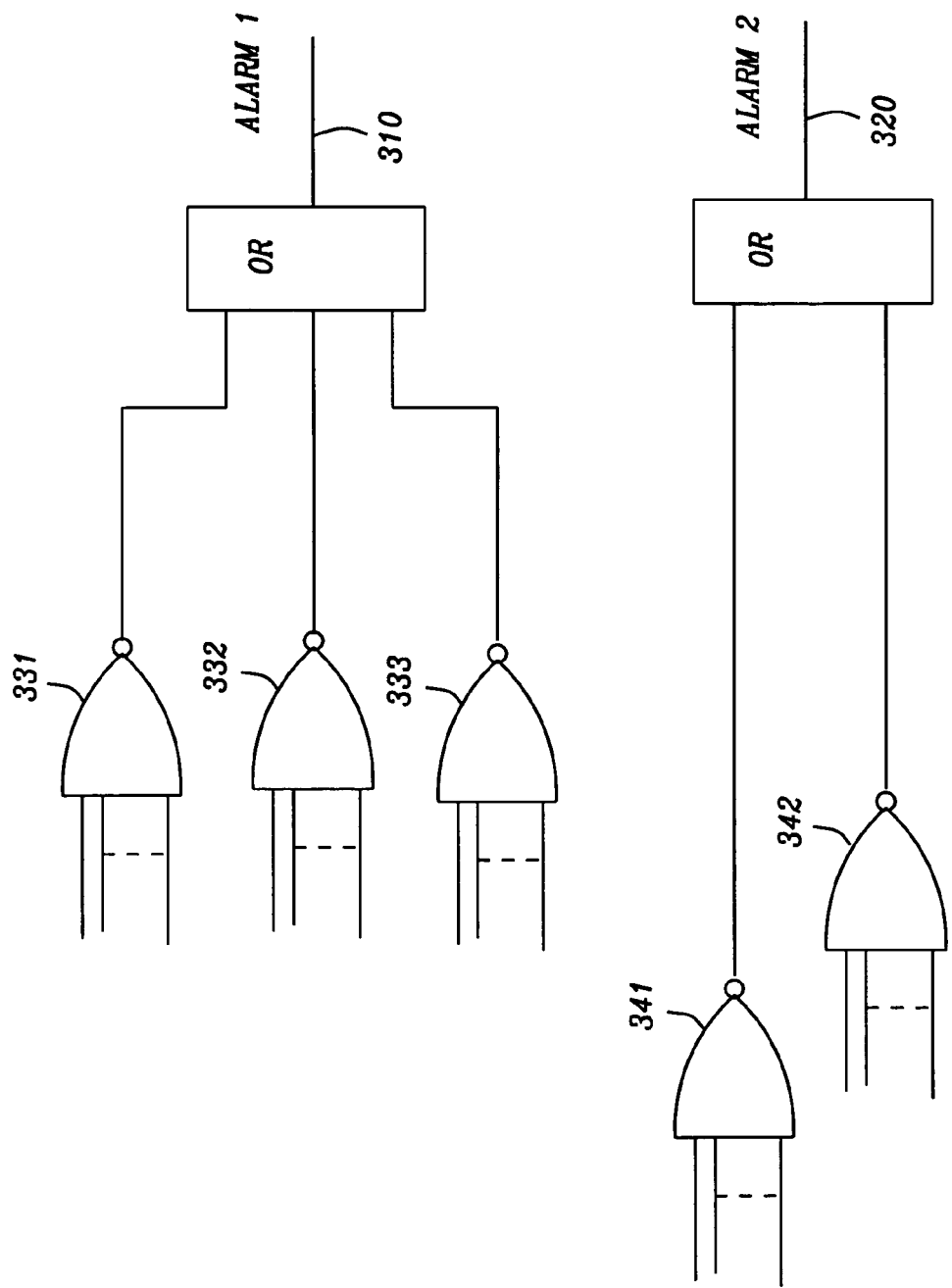
FIG. 3 shows extended applications of the main embodiment of this invention.

An extension of the circuit in FIG. 1 is achieved by utilizing multiple NAND gates which are fed by groups of vias from the metal wire loop. The outputs of these NAND gates are sent to the inputs of an OR gate. The output of the OR gate is the collective security alarm signal. This is shown in FIG. 3.

Another extension of the circuit in FIG. 1 is cascading or combining NAND gates with OR gates. This is illustrated in FIG. 3. This would allow several N-wide NAND gate subsystems with separate metal wire loops to exist on the integrated circuit die. The outputs of these NANDS would feed an 'OR' circuit which would detect a '1' level. This '1' level would indicate that one of the metal wire loops was broken within one of the NAND gate sub systems shown in FIG. 1.

Another extension of the circuit in FIG. 1 is achieved by placing multiple metal wire loops over different sections of the integrated circuit if different types of sensitive circuitry needs to be protected in separate isolated sections. This circuit extension is shown in FIG. 3. The different metal wire loops feed separate NAND gates 331–333, 341–342 which feed separate OR gates 310, 320 to produce separate security alarm signals, Alarm1 and Alarm2 (310, 320). These separate security alarm signals can initiate separate security actions for their respective circuits or memory. For example, one security alarm signal generated by the metal wire loops protecting EEPROM circuits may result in the automatic erasure of the EEPROM programming. Another security alarm signal generated by the metal wire loops protecting RAM circuits may result in the erasure of the RAM contents.

In summary, there are two types of vias shown in FIG. 1. The VN vias are used to detect a voltage discharge caused by a metal wire line break and to transmit this voltage discharge to the input of a NAND gate. The VD vias are for periodically connecting the metal wire loop to a discharge path to ground to prepare for detection of a metal wire line break, after the charging process.

The advantages of this invention are that it senses any disruption of the wire path. As a result of the disruption, an alarm signal is generated which can activate actions, which will destroy sensitive data. Also, the circuit of this invention is very easy to implement in standard device technology. Another big advantage is that this circuit does not consume static power. It only consumes switching power when charge/discharge is activated.

While the invention has been described in terms of the preferred embodiments, those skilled in the art will recognize that various changes in form and details may be made without departing from the spirit and scope of the invention.

What is claimed is:

1. A die anti-tampering sensor for protecting against tampering of integrated circuits comprising:
    a metal wire loop located in a metallization layer above said integrated circuits,
    a semiconductor load device which charges said metal wire loop to a logical '1' level,
    a multiplicity of semiconductor devices which discharge said metal wire loop to a logical '0' level at certain periodic times,
    a NAND logic gate, with logic inputs, placed among said integrated circuits,
    a multiplicity of vias connecting a multiplicity of points along said metal wire loop down to said inputs of said NAND logic gate within said integrated circuit,
    a multiplicity of vias connecting a multiplicity of points along said metal wire loop down to said semiconductor devices which discharge said metal wire loop to a logical '0' level at certain periodic times, and
    an output of said NAND logic gate which goes to a logic '1' and activates an alarm and security action whenever any one of said NAND inputs goes to logical '0'.

2. The die anti-tampering sensor of claim 1 wherein said metal wire loop is placed over circuitry and memory to be protected.

3. The die anti-tampering sensor of claim 2 wherein said metal wire length has a loop which is long enough to loop across over said circuitry and memory leaving limited spaces between adjacent metal pieces.

4. The die anti-tampering sensor of claim 3 wherein said limited spaces between said adjacent metal pieces of said loop are decreased or increased to satisfy a given security requirement.

5. The die anti-tampering sensor of claim 3 wherein said wire loop has a multiplicity of via pairs distributed across said length of said wire loop.

6. The die anti-tampering sensor of claim 5 wherein said via pairs have a $1^{st}$ via to connect the metal wire loop to one of a multiplicity of said logic inputs of said NAND logic gate.

7. The die anti-tampering sensor of claim 6 wherein said $1^{st}$ via of said via pairs which connects the metal wire loop to said logic inputs of said NAND logic gates in order to detect an inability of '0' to '1' transition which signifies a break or interruption of the metal wire loop.

8. The die anti-tampering sensor of claim 7 wherein said $2^{nd}$ via of said via pairs which connects the metal wire loop to said semiconductor devices which discharge said metal wire loop to said logical '0' level in order to remove residual charge which could lead to undetected interruption of the metal wire loop.

9. The die anti-tampering sensor of claim 5 wherein said via pairs have a $2^{nd}$ via to connect the metal wire loop to one of a multiplicity of said semiconductor devices which discharge said metal wire loop to a logical '0' level, at certain periodic times.

10. The die anti-tampering sensor of claim 1 wherein said semiconductor devices which discharge said metal wire loop to logical '0' by a control clock signal.

11. The die anti-tampering sensor of claim 10 wherein said control clock signal has a '1' level to allow said discharging said metal wire loop to logical '0' and wherein said control clock signal has a '0' level to allow said metal wire loop to charge up to a logical '1' which allows sensing of a break in said metal wire loop.

12. The die anti-tampering sensor of claim 10 wherein said semiconductor device which discharges said metal wire loop is an N-channel metal oxide field effect transistor NMOS FET whose source is connected to ground, whose gate is connected to said control clock signal, and whose drain is connected to said second via which connects to the metal wire loop.

13. The die anti-tampering sensor of claim 12 wherein said semiconductor load device which charges said metal wire loop to a logical '1' level whenever the control clock signal is at a logical '0' level.

14. The die anti-tampering sensor of claim 13 wherein said semiconductor load device is a p-channel metal oxide field effect transistor PMOS FET whose source is connected to a power supply and whose gate is connected to clock control signal and the drain is connected to said drain of said NMOS FET.

15. The die anti-tampering sensor of claim 14 wherein said PMOS FET and said NMOS FETs form a dynamic, low power circuit which dissipates AC power only.

16. The die anti-tampering sensor of claim 1 wherein said NAND logic gate has an output which goes to a logical '1' whenever any NAND gate inputs go to a logical '0' wherein said NAND logical '1' output activates a security alarm or a security action such as automatic erase of electrically erasable programmable read only memory (EEPROM).

17. The die anti-tampering sensor of claim 1 wherein said metal wire loop could made from other conductive material such as polysilicon.

18. The die anti-tampering sensor of claim 1 wherein said integrated circuits have multiple metal wire loops protecting separate circuit and memory areas.

19. The die anti-tampering sensor of claim 1 wherein outputs of multiple NAND gates go to OR circuits to develop a composite security alarm signal.

20. The die anti-tampering sensor of claim 1 wherein separate isolated multiple metal wire loops protect separate sections of circuits.

21. A method of protecting against tampering of integrated circuits comprising the steps of:
    locating a metal wire loop in a metallization layer above said integrated circuits,
    charging said metal wire loop to a logical '1' level with a semiconductor load device,
    discharging said metal wire loop to a logical '0' level at certain periodic times with a multiplicity of semiconductor devices,
    placing a NAND logic gate, with logic inputs, among said integrated circuits,
    connecting a multiplicity of points along said metal wire loop down to said inputs of said NAND logic gate within said integrated circuit with a multiplicity of vias,
    connecting a multiplicity of points along said metal wire loop down to said semiconductor devices which discharge said metal wire loop to a logical '0' level at certain periodic times with a multiplicity of vias, and activating an alarm and security action whenever any one of said NAND inputs goes to logical '0' causing the output of said NAND logic gate go to a logic '1'.

22. The method of protecting against tampering of integrated circuits of claim 21 wherein said metal wire loop is placed over circuitry and memory to be protected.

23. The method of protecting against tampering of integrated circuits of claim 22 wherein said metal wire length has a loop which is long enough to loop across over said circuitry and memory leaving limited spaces between adjacent metal pieces.

24. The method of protecting against tampering of integrated circuits of claim 23 wherein said limited spaces between said adjacent metal pieces of said loop are decreased or increased to satisfy a given security requirement.

25. The method of protecting against tampering of integrated circuits of claim 23 wherein said wire loop has a multiplicity of via pairs distributed across said length of said wire loop.

26. The method of protecting against tampering of integrated circuits of claim 25 wherein said via pairs have a $1^{st}$ via to connect the metal wire loop to one of a multiplicity of said logic inputs of said NAND logic gate.

27. The method of protecting against tampering of integrated circuits of claim 26 wherein said $1^{st}$ via of said via pairs which connects the metal wire loop to said logic inputs of said NAND logic gates in order to detect inability of logical '0' to logical '1' transition which signifies a break or interruption of the metal wire loop.

28. The method of protecting against tampering of integrated circuits of claim 27 wherein said $2^{nd}$ via of said via pairs which connects the metal wire loop to said semiconductor devices which discharge said metal wire loop to said logical '0' level in order to remove residual charge which could lead to undetected interruption of the metal wire loop.

29. The method of protecting against tampering of integrated circuits of claim 25 wherein said via pairs have a $2^{nd}$ via to connect the metal wire loop to one of a multiplicity of said semiconductor devices which discharge said metal wire loop to a logical '0' level, at certain periodic times.

30. The method of protecting against tampering of integrated circuits of claim 21 wherein said semiconductor devices which discharge said metal wire loop to logical '0' by a control clock signal.

31. The method of protecting against tampering of integrated circuits of claim 30 wherein said control clock signal has a '1' level to allow said discharging said metal wire loop to logical '0' and wherein said control clock signal has a '0' level to allow said metal wire loop to charge up to a logical '1' which allows sensing of a break in said metal wire loop.

32. The method of protecting against tampering of integrated circuits of claim 30 wherein said semiconductor device which discharges said metal wire loop is an N-channel metal oxide field effect transistor NMOS FET whose source is connected to ground, whose gate is connected to said control clock signal, and whose drain is connected to said second via which connects to the metal wire loop.

33. The method of protecting against tampering of integrated circuits of claim 32 wherein said semiconductor load device which charges said metal wire loop to a logical '1' level whenever the control clock signal is at a logical '0' level.

34. The method of protecting against tampering of integrated circuits of claim 33 wherein said semiconductor load device is a p-channel metal oxide field effect transistor PMOS FET whose source is connected to a power supply and whose gate is connected to clock control signal and the drain is connected to said drain of said NMOS FET.

35. The method of protecting against tampering of integrated circuits of claim 34 wherein said PMOS FET and said NMOS FETs form a dynamic, low power circuit which dissipates AC power only.

36. The method of protecting against tampering of integrated circuits of claim 21 wherein said NAND logic gate has an output which goes to a logical '1' whenever any NAND gate inputs go to a logical '0' wherein said NAND logical '1' output activates a security alarm or a security action such as automatic erase of electrically erasable programmable read only memory (EEPROM).

37. The method of protecting against tampering of integrated circuits of claim 21 wherein said metal wire loop could made from other conductive material such as polysilicon.

38. The method of protecting against tampering of integrated circuits of claim 21 wherein said integrated circuits have multiple metal wire loops protecting separate circuit and memory areas.

39. The method of protecting against tampering of integrated circuits of claim 21 wherein outputs of multiple NAND gates go to OR circuits to develop a composite security alarm signal.

40. The method of protecting against tampering of integrated circuits of claim 21 wherein separate isolated multiple metal wire loops protect separate sections of circuits.

* * * * *